United States Patent [19]

Tsuchiya et al.

[11] 3,794,935

[45] Feb. 26, 1974

[54] VARIABLE EQUALIZER

[75] Inventors: Toru Tsuchiya; Seiya Shida, both of Tokyo, Japan

[73] Assignee: Nippon Electric Company, Limited, Tokyo, Japan

[22] Filed: May 30, 1972

[21] Appl. No.: 257,551

[30] Foreign Application Priority Data

June 9, 1971 Japan .............................. 46-41296

[52] U.S. Cl. .............................. 333/28 R, 330/151

[51] Int. Cl. .............................. H03h 7/14

[58] Field of Search .............................. 333/14, 18, 28 R

[56] References Cited

UNITED STATES PATENTS

| | | | |
|---|---|---|---|
| 2,776,410 | 1/1957 | Guanella | 333/28 R |
| 3,336,540 | 8/1967 | Kwartiroff et al. | 333/28 R |
| 3,665,345 | 5/1972 | Dolby | 333/14 |
| 3,691,486 | 9/1972 | Borsuk et al. | 333/28 R |

*Primary Examiner*—Paul L. Gensler

*Attorney, Agent, or Firm*—Sughrue, Rothwell, Mion, Zinn & Macpeak

[57] ABSTRACT

An equalizer, having a variable amplitude characteristic, for equalizing amplitude distortion especially in frequency-division multiplexed systems. The equalizer includes parallel signal paths, one path transmitting received signals essentially unchanged while the second path includes a circuit network having the transfer function $t_A = (2\alpha\, k/1 + \alpha k)$. The parallel paths are coupled to a subtraction circuit, the output of the subtraction circuit appearing as the output of equalizer. The ratio of the output signal $V_2$ at the output of the subtraction circuit to the input signal $V_1$ is equal to $(1 - \alpha k/1 + \alpha k)$. Various circuit arrangements which produce the transfer function $T_A$ are disclosed.

9 Claims, 10 Drawing Figures

VARIABLE EQUALIZER

The present invention relates to an equalizer for equalizing the amplitude distortion caused in communication transmission lines for frequency-division multiplexed signals and, more particularly, to a variable equalizer whose amplitude characteristic is variable.

Conventional variable equalizers may be classified broadly into two types. One of them resorts to the impedance reflection, and the other employs a feedback loop. The former is the so-called Bode-type variable equalizer, named after its inventor H.W. Bode. Various kinds of this type of equalizer have been proposed ever since. On the other hand, the latter is exemplified by that one introduced by Mr. Endo et al in their paper entitled "A Method of Constructing A Variable Equalizer" published in the Journal of the Institute of Electronics and Communication Engineers of Japan, Apr. issue, 1969, pages A 166 ≈ 172. In either type, the variable characteristic is of linear approximation, that is, the attenuation varies in virtually linear proportion to a variable resistor value used therein. These equalizers have such transfer function as will be given by the following expressions:

$$(R + \alpha/1 + R\alpha) \tag{1}$$

Modifying Expression (1), $$(1 - k\alpha/1 + k\alpha) \tag{2}$$

where $\alpha$ stands for a function which determines the variable frequency characteristic, while R and k for real-number coefficients which determine the variable values.

As discussed in said treatise a Bode type variable equalizer must have in its auxiliary circuit a circuit having at least at its one end a fixed resistance image impedance. Also, when used as a wideband compensating equalizer, it needs a buffer amplifier to be inserted between auxiliary circuits. This unavoidably complicates the circuit as a whole. The equalizer proposed by Mr. Endo et al does not rely on the impedance reflection but on a feedback loop. This, however, requires sufficient stability margin for the feedback loop. Whereas the larger the phase deviation is, the greater becomes the deviation of the variable characteristic from the desired value, making the stability margin smaller. Especially in the device for the wideband and/or high frequency use, the requirement for high stability margin must strictly be maintained. For this purpose, we must rely on high quality amplifiers of excellent performance which need high level of manufacturing technology.

In view of the foregoing, a principal object of this invention is to provide a variable equalizer which can be realized through simple circuit arrangement and operated stably, having a variable characteristic determined by said expression (1) or (2) as is the case with the prior art equalizer.

With this and other objects in view, the present invention provides a variable equalizer characterized in that main and auxiliary transmission paths constitute the equalizer without any feedback loop. The auxiliary transmission is provided with a circuit, the real part of whose impedance characteristic substantially satisfies the necessary frequency characteristic, and also with a variable resistance element, with the ratio of the voltages applied to the frequency characteristic circuit and to the variable resistance element respectively being adapted to vary in response to the change in the resistance of the variable resistance element. The voltage transfer function of the auxiliary circuit is changed as the result of the change in the voltage ratio, thus changing the equalizing characteristic.

The features and advantages of the invention will become more apparent from the following description taken in conjunction with the accompanying drawings, wherein.

Figure 1:
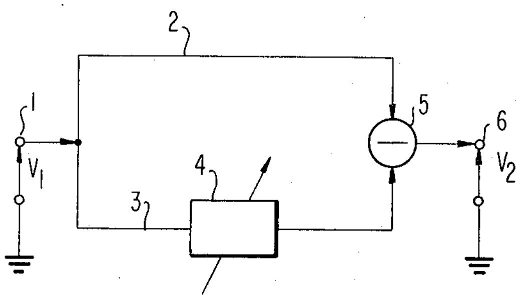
FIG. 1 is a block diagram showing the principle of the variable equalizer of this invention.

Referring to FIG. 1, which shows a fundamental circuit arrangement based on the principle of this invention, voltage $V_1$ is applied through an input terminal 1 to a main transmission line 2 and an auxiliary transmission line 3. A network 4 having voltage transfer function $T_A$ as given in Eq. (3) below is inserted in the auxiliary transmission line 3.

$$T_A = (2\ \alpha k/1 + \alpha k) \tag{3}$$

The difference between the output voltages of the main transmission line 2 and the auxiliary transmission line 3 is obtained at a subtraction circuit 5 and delivered to an output terminal 6. Assuming the voltage at the output terminal 6 is $V_2$, the voltage transfer T of the circuit section lying between the input terminal 1 and the output terminal 6 is given as $$T = (V_2/V_1 = 1 - T_A = (1 - \alpha k/1 + \alpha k) \tag{4}$$

It will be noted that Eq. (4) agrees with (2). Hence, if a circuit having a voltage transfer function $T_A$ expressed by Eq. (3) can be realized, then the circuit shown in FIG. 1 functions as a variable equalizer whose variable characteristic is the same as that of the prior art equalizer.

Figure 2:
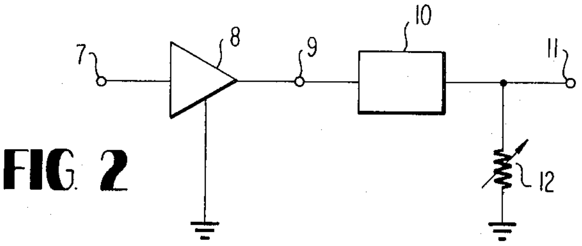
FIG. 2 is a circuit diagram showing a concrete example of the network 4.

A simplified version of the circuit having such voltage transfer function $T_A$ is schematically shown in FIG. 2, in which voltage $V_1$ at an input terminal 7 is amplified by an amplifier 8 whose voltage amplification factor is 2, and the resultant output voltage $2V_1$ is obtained at its output terminal 9. This output voltage is sent to an output terminal 11 through a two-terminal circuit 10 whose admittance is *y*. The junction of the two-terminal circuit 10 and the output terminal 11 is grounded through a variable resistor 12 having a resistance k. In this circuit the voltage transfer function $T_A$ of the circuit section ranging from the terminal 7 to the terminal 11 is given as $$T_A = 2yk/(1 + yk) \tag{5}$$

Let the real part of $y[\mathrm{Re}(y)]$ be $\alpha$. Then it will become apparent that the circuit 4 having a voltage transfer function given by Eq. (3) can be realized from the circuit shown in FIG. 2. Thus, the variable amplitude frequency characteristic $\Delta A$ (in nepers) is expressed by $$\left|\frac{1}{T}\right| \Delta A = 109_e |1/T| \approx 2k \cdot Re(y) = 2K\alpha \tag{6}$$

This equalizer is obtained by approximating the real part of admittance *y* to the desired variable frequency characteristic.

Figure 3:
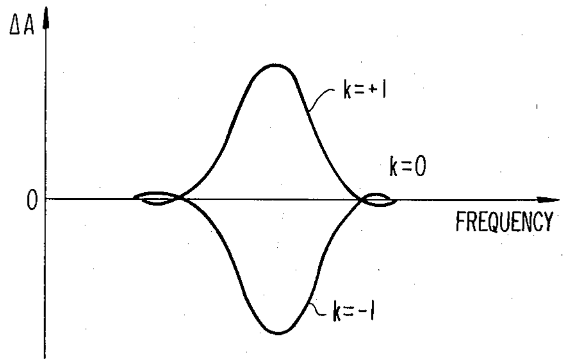
FIG. 3 shows curves of the bump type variable amplitude characteristic.
Figure 4:
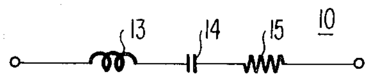
FIG. 4 is a circuit diagram showing an example of the two-terminal circuit 10 of FIG. 2.

The variable amplitude frequency characteristic $\Delta A$ assumes the variable characteristic of a bump type variable equalizer as shown in FIG. 3 when the real part of *y* is formed of an inductive element 13, a capacitive element 14, and a resistive element 15, in the form of series circuit, as illustrated in FIG. 4.

It should be noted that the use of only one variable resistor 12 (FIG. 2) does not enable us to realize a bidirectional (upward and downward) variable characteristic shown in FIG. 3. Another negative variable resistance *k* such as, a negative resistance converter (NIC) or a similar device should be employed as the resistor 12. In the bump type variable equalizer, however, the bidirectional variable characteristic can be also realized in the case where the resistance R of the resistive element 15 of FIG. 4 meets the following requirement.

$$R \geqq 2\max(k) \tag{7}$$

Figure 5:
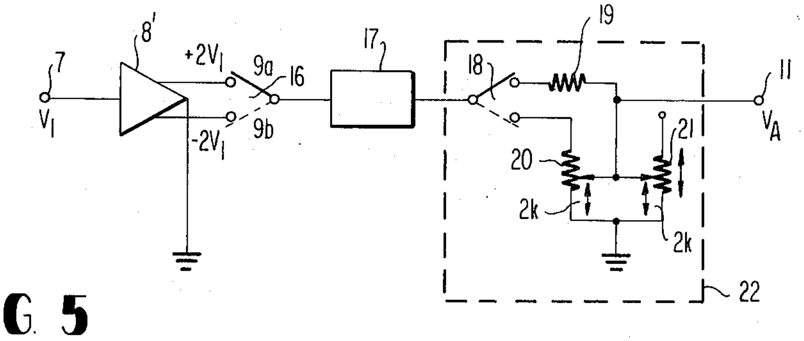
FIG. 5 is a circuit diagram showing a modified network 4.

An example of the network arrangement of this invention is shown in FIG. 5 in which a voltage $+2V_1$ is obtained at an output terminal 9*a*, and a voltage $-2V_1$ at another output terminal 9*b*, of an operational amplifier 8' whose voltage amplification factor is 2. These output terminals 9a and 9b are changed over by a switch 16 and connected to a two-terminal circuit 17 having an admittance *y'*. It is assumed that the relationship (8) below exists between the two admittances *y'* and *y*.

$$1/y = 1/y' + R \tag{8}$$

This indicates that in the circuit shown in FIG. 4, the admittance of the part except the resistance element 15 is *y'*. The other end of the two-terminal circuit 17 is connected to the output terminal 11 through one of the contacts of the switch 18 and thence through a resistor 19 whose resistance is R. The other switching contact of the switch 18 is grounded by way of a variable resistor 20. The moving contact of the variable resistor 20 and also that of another variable resistor 21 similar to the variable resistor 20 are connected to the output terminal 11. One end of the variable resistor 21 is grounded. The total resistance of the variable resistors 20 and 21 is assumed to be R, and the resistance of the circuit section ranging from the ground to each of their moving contacts is assumed to be 2*k*. The switches 16 and 18 are interlocked with each other. The switch 18 is connected to the resistor 19, while the switch 16 is on the side of terminal 9*a*.

In the switching position indicated by the solid line in FIG. 5, the voltage transfer function $T_A$ of the circuit section lying between the terminals 7 and 11 agrees with Eq. (5). On the other hand, in the switching position indicated by the dotted line, a resistor having resistance equal to (R—2k) of the variable resistor 20 is connected to the circuit without the resistor 19. Under this condition, it is apparent that its transfer function $T_A$ satisfies Eq. (5) having $-k$ in place of *k*. Thus, a bidirectional variable characteristic as shown in FIG. 3 can be obtained.

Figure 6:
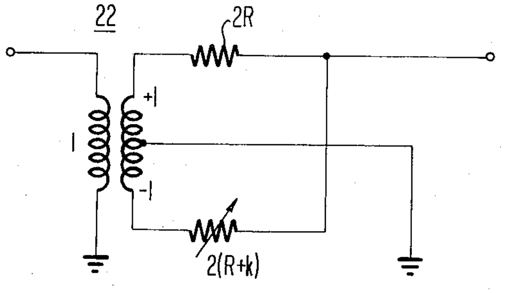
FIG. 6 is a block diagram showing another example of the arrangement of the circuit shown encircled by the dotted line in FIG. 5.

The circuit section 22 encircled by the dotted line in FIG. 5 can be also realized by a Jaumann circuit as shown in FIG. 6. In this case, the switch 16 becomes unnecessary, and the amplifier 8' can be replaced by the amplifier 8 as shown in FIG. 2.

Figure 7:
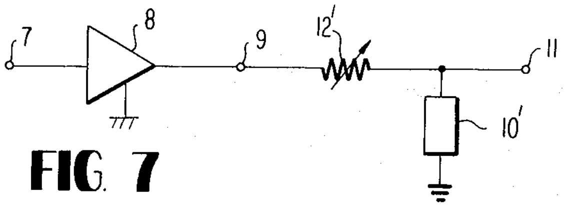
FIG. 7 is a circuit diagram showing a variable equalizer of this invention, which stands in duality with the circuit of FIG. 2.

The voltage transfer function $T_A$ is based fundamentally on the circuit shown in FIG. 2. This transfer function can also be set up in a circuit arrangement shown in FIG. 7 which is in duality with the circuit shown in FIG. 2. In FIG. 7, it is assumed that a voltage $V_1$ is present at an input terminal 7, and a voltage $V_2$ at an output terminal 11. The numeral 8 represents an amplifier whose voltage amplification factor is 2; 12', a variable resistor with conductance value g; and 10', a two-terminal circuit with impedance Z. Then it is evident that the voltage transfer function $T_A$ may be expressed as $$T_A = V_2/V_1 = 2gZ/(1 + gZ) \tag{9}$$

Figure 8:
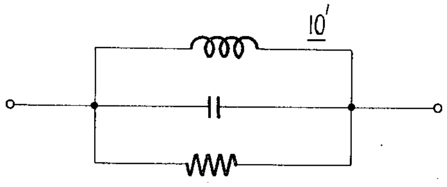
FIG. 8 is a circuit diagram showing an example of the two-terminal circuit 10' of FIG. 7.

Therefore, by substituting Re(Z) by $\alpha$ in Eq. (9), the condition of Eq. (3) can be established. The circuit shown in FIG. 7 makes available the same modifications as made on the fundamental circuit shown in FIG. 2. FIG. 8 shows an example of the two-terminal circuit of FIG. 7, which corresponds to the circuit shown in FIG. 4.

Figure 9:
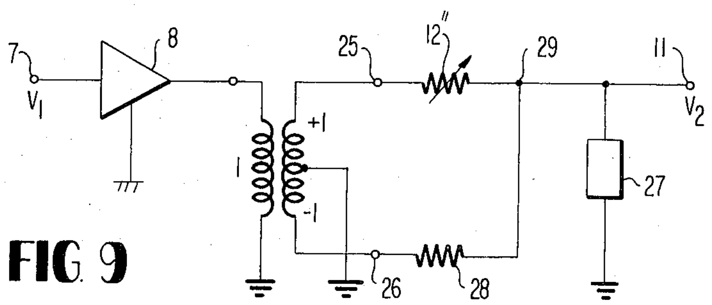
FIG. 9 is a circuit diagram showing another example of the variable equalizer embodying this invention.

FIG. 9 shows another embodiment of this invention, which corresponds to that shown in FIG. 5 or 6. In FIG. 9, $2V_1$ is an output voltage of an amplifier 8. This voltage is divided into two components of in-phase and inverted phase, by a hybrid transformer. These are $+2V_1$ and $-2V_1$ emerging at terminals 25 and 26, respectively. The numeral 27 represents a two-terminal circuit having impedance value Z', where the following relationship is established.

$$1/Z' + G = 1/Z \tag{10}$$

It is assumed that the conductance of the fixed resistor 28 is *G*/2 (mho) and that of the variable resistor 12'' is $g + G/2$(mho). Based on Eq. (10), the following equation may be derived from Kirchhoff's laws applied to the connection point 29.

$$[(g + G/2)](2V_1 - V_2) + G/2(-2V_1 - V_2) + 1/Z(-V_2) = 0 \quad (11)$$

From Eqs. (10) and (11), the voltage transfer function $T_A$ can be found as follows.

$$T_A = V_2/V_1 = 2g/[g+G+ 1/Z'] = 2g/[g + 1/Z] = 2gZ/[1 + gZ] \quad (12)$$

This condition agrees with that of Eq. (9). Then, if $$G \geqq 2 \max(g) \quad (13)$$

a bidirectional variable characteristic can be realized as in the arrangement shown in FIG. 3.

Figure 10:
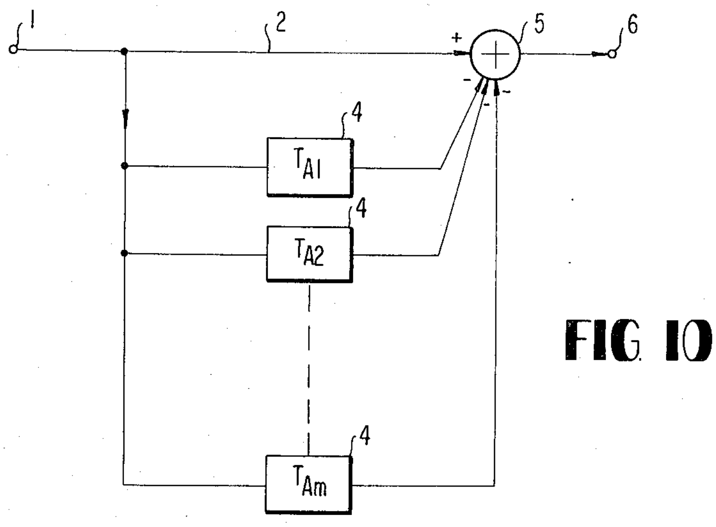
FIG. 10 is a block diagram showing a wideband variable equalizer of this invention.

FIG. 10 shows in block form a wideband variable equalizer of this invention in which a plurality of the foregoing networks 4 each having the voltage transfer function $T_A$ are disposed in parallel, and the voltage transfer function $T_{Ai}$ ($i = 1, 2, \ldots m$) are arranged at suitable intervals on the frequency axis.

As has been described above, the variable equalizer of this invention has numerous useful features. For example, the auxiliary transmission line is constituted without using feedback loop, and wave distortion can be eliminated through the equalizing operation by changing the voltage ratio at the variable resistor 12 (or 20 or 21) to the variable frequency characteristic circuit 10, which are inserted in the auxiliary transmission line. This circuit construction can be easily realized through simple arrangement, yet is highly suited for variable equalizers for precisely equalizing wideband high frequency amplitudes. The phase deviation unavoidably introduced in the auxiliary transmission line at high frequencies can easily be compensated for by inserting in the main transmission line a circuit having the same degree of phase shift as the phase deviation at the auxiliary transmission line. This is one of the great advantages over the conventional arrangement which uses a feedback loop. While the invention has been described by way of specific examples, it will be apparent that the invention is not limited thereto or thereby. Various modifications may be made on what has been disclosed in this specifications. For example, the amplifier 8 of FIG. 2 may be replaced with an attenuator, inserted in the main transmission line 2, which gives attenuation to the signal voltage at a rate of one-half. The nonlinear resistance of diode may be utilized for the variable resistor 12 (or 20 or 21).

What is claimed is:

1. An equalizer of variable amplitude characteristic comprising:

means for providing first and second analog signals derived from an input signal both proportional to said input signal to be equalized by said equalizer, said second analog signal having an amplitude substantially twice as great as said first analog signal;

a two-terminal circuit and a variable resistance element connected to a common junction the real part of the admittance of said two terminal circuit having a predetermined frequency characteristic, said two-terminal circuit and variable resistance element being connected to the output of said second analog signal providing means; and means for providing a difference signal representative of the arithmetic difference in amplitude between said first analog signal and the analog signal obtained at said common junction of said variable resistance element and said two-terminal circuit;

wherein the ratio of the voltage applied to said two-terminal circuit to that applied to said resistance element is changed by varying the resistance of said resistance element, thereby to obtain the output analog signal of said equalizer from said difference signal.

2. The equalizer of claim 1 wherein said analog signal obtained at said common junction is equal to the amplitude of the first analog signal multiplied by the transfer function given by the expression $$(2 \alpha k/1 + \alpha k,)$$

where $\alpha$ is a predetermined frequency dependent term and k is a real number variable coefficient whose absolute value is not greater than unity, and said variable resistance means being operative for varying the value of $k$, whereby the variable amplitude frequency characteristic of said equalizer is given by the subtraction of said second analog signal from said first analog signal, said variable amplitude frequency characteristic being substantially equal to $2k$ (in nepers).

3. The equalizer of claim 2 further comprising a plurality of parallel connected circuit means having the voltage transfer function $$T_A = (2 \alpha k/1 + \alpha k).$$

4. The equalizer of claim 2 wherein said means for providing a second analog signal comprises an amplifier with a gain of substantially two.

5. The equalizer of claim 4 wherein said two terminal circuit is comprised of a series connected inductance, capacitance and resistance.

6. The equalizer of claim 4 wherein said amplifier includes two outputs respectively providing a gain of substantially plus and minus two, said two terminal circuit including a series connected inductance and capacitance, said variable resistance circuit comprising a fixed resistor serially connected to a parallel circuit comprised of a first and second variable resistor, the circuit node between said fixed resistor and parallel circuit and being connected to said second input of said subtraction circuit, further including a first switch means selectively connecting the input of said two terminal circuit to either of the two amplifier outputs and a second switch means selectively connecting the output of said two terminal circuit to either said fixed resistor or directly to the full value of one of the variable resistors of said parallel circuit.

7. The equalizer of claim 4 wherein said two terminal circuit coupled to said amplifier includes a series connected inductance and a capacitance, and said variable resistance circuit coupled to said two terminal circuit comprises a hybrid transformer having a primary winding coupled to the two terminal circuit, a secondary winding having a grounded center tap, and a fixed resistance and a variable resistance having their one end coupled together and their other ends coupled to the respective ends of the secondary winding.

8. The equalizer of claim 4 wherein said two terminal circuit is comprised of a parallel connected inductance, resistance and capacitance.

9. The equalizer of claim 4 wherein said two terminal circuit comprises a parallel connected inductance and capacitance and said variable resistance circuit comprises a hybrid transformer having a primary winding coupled to the amplifier output, a secondary winding having a grounded center tap, and a fixed resistance and a variable resistance having their one ends coupled together to the two terminal circuit and their other ends coupled to the respective ends of the secondary winding.

* * * * *

UNITED STATES PATENT OFFICE
CERTIFICATE OF CORRECTION

Patent No. 3,794,935 Dated February 26, 1974

Inventor(s) TORU TSUCHIYA and SEIYA SHIDA

It is certified that error appears in the above-identified patent and that said Letters Patent are hereby corrected as shown below:

In the ABSTRACT:

Line 7, delete "$t_A = (2\alpha k/1 + \alpha k)$" and insert

--$T_A = 2\alpha k/(1 + \alpha k)$--

Lines 11 and 12, delete "$(1 - \alpha k/1 + \alpha k)$" and insert

--$(1 - \alpha k)/(1 + \alpha k)$--

Column 1

Line 25, delete "$(R + \alpha/1 + R\alpha)$" and insert

--$(R + \alpha)/(1 + R\alpha)$--

Line 31, delete "$(1 - k\alpha/1 + k\alpha)$" and insert

--$(1 - k\alpha)/(1 + k\alpha)$--

Line 67, after "transmission" insert --path--

Column 2

Line 45, delete "$T_A = (2\alpha k/1 + \alpha k)$" and insert

--$T_A = 2\alpha k/(1 + \alpha k)$--

UNITED STATES PATENT OFFICE
CERTIFICATE OF CORRECTION

Patent No. 3,794,935 Dated February 26, 1974

Inventor(s) TORU TSUCHIYA and SEIYA SHIDA

It is certified that error appears in the above-identified patent and that said Letters Patent are hereby corrected as shown below:

Column 2 (Cont'd)

Line 56, delete "$T = (V_2/V_1 = 1 - T_A = (1 - \alpha k/1 + \alpha k)$"

and insert --$T = V_2/V_1 = 1 - T_A = (1 - \alpha k)/(1 + \alpha k)$--

Column 3

Line 21, delete "$\left|\frac{1}{T}\right| \Delta A + 109_e \left|1/T\right| \approx 2\,k \cdot Re(y) = 2K\alpha$"

and insert --$\Delta A - \log_e \left|\frac{1}{T}\right| = 2k \cdot Re(y) = 2k\alpha$--

Column 5

Line 3, delete brackets in equation.

Column 6

Line 18, delete "$(2\alpha k/1 + \alpha k,)$" and insert --$2\alpha k/(1 + \alpha k)$,--

Line 35, delete "$T_A = (2\alpha k/1 + \alpha k)$," and insert

--$T_A = 2\alpha k/(1 + \alpha k)$.--

Line 51, after "circuit" delete "and"

Line 52, after "circuit," insert --and--

Signed and sealed this 10th day of September 1974.

(SEAL)
Attest:

McCOY M. GIBSON, JR.
Attesting Officer

C. MARSHALL DANN
Commissioner of Patents